US007138469B2

(12) United States Patent
Collina et al.

(10) Patent No.: US 7,138,469 B2
(45) Date of Patent: Nov. 21, 2006

(54) PROCESS FOR THE POLYMERIZATION OF OLEFINS

(75) Inventors: Gianni Collina, Ferrara (IT); Ofelia Fusco, Ferrara (IT); Eduardo Chicote Carrion, Bayreuth (DE); Alberto Gil, Tarragona (ES); Volker Dolle, Bensheim (DE); Horst Klassen, Erftstadt (DE); Karl-Heinz Kagerbauer, Erftstadt (DE)

(73) Assignee: Basell Poliolefine Italia S.p.A., Milan (IT)

( * ) Notice: Subject to any disclaimer, the term of this patent is extended or adjusted under 35 U.S.C. 154(b) by 606 days.

(21) Appl. No.: 10/473,313

(22) PCT Filed: Dec. 10, 2002

(86) PCT No.: PCT/EP02/14111

§ 371 (c)(1),
(2), (4) Date: Sep. 26, 2003

(87) PCT Pub. No.: WO03/054035

PCT Pub. Date: Jul. 3, 2003

(65) Prior Publication Data
US 2004/0077490 A1  Apr. 22, 2004

(30) Foreign Application Priority Data
Dec. 12, 2001  (EP)  ................... 01204842

(51) Int. Cl.
*C08F 4/60* (2006.01)
*C08F 4/602* (2006.01)
*C08F 4/02* (2006.01)

(52) U.S. Cl. ............... 526/124.9; 526/88; 526/348; 502/103; 502/115; 502/126; 502/127

(58) Field of Classification Search ........... 502/103, 502/115, 126, 127; 526/88, 124.9, 348
See application file for complete search history.

(56) References Cited

U.S. PATENT DOCUMENTS

| 4,192,774 A | 3/1980 | Kortbeek et al. ....... 252/429 B |
| 4,298,718 A | 11/1981 | Mayr et al. .................. 526/125 |
| 4,399,054 A | 8/1983 | Ferraris et al. .......... 252/429 B |
| 4,469,648 A | 9/1984 | Ferraris et al. ................. 264/9 |
| 4,495,338 A | 1/1985 | Mayr et al. .................. 526/125 |
| 5,395,810 A | 3/1995 | Shamshoum et al. ....... 502/113 |
| 5,624,878 A | 4/1997 | Devore et al. .............. 502/152 |
| 5,648,428 A | 7/1997 | Reddy et al. ................ 526/116 |
| 5,733,987 A | 3/1998 | Covezzi et al. ............... 526/65 |

FOREIGN PATENT DOCUMENTS

| EP | 0361494 | 4/1990 |
| EP | 0395083 | 10/1990 |
| EP | 0439964 | 8/1991 |
| EP | 0553805 | 8/1993 |
| EP | 0553806 | 8/1993 |
| EP | 0601525 | 6/1994 |
| EP | 0728769 | 8/1996 |
| WO | 9221706 | 12/1992 |
| WO | 9303078 | 2/1993 |
| WO | 9844009 | 10/1998 |
| WO | 0132307 | 5/2001 |

*Primary Examiner*—Caixia Lu
(74) *Attorney, Agent, or Firm*—Jarrod N Raphael; William R Reid

(57) ABSTRACT

Process for the polymerization of olefins $CH_2=CHR$, in which R is hydrogen or a hydrocarbon radical with 1–12 carbon atoms, carried out in the presence of a catalyst component (A) comprising Mg, Ti and halogen as essential elements and of a catalyst component (B) capable to produce, under the same polymerization conditions, a polymer with an average particle size lower than that obtainable with the said catalyst component A. The said process provides polymers with increased bulk density.

29 Claims, No Drawings

PROCESS FOR THE POLYMERIZATION OF OLEFINS

This application is the U.S. national phase of International Application PCT/EP02/14111, filed Dec. 10, 2002.

The present invention relates to a process for the polymerization of olefins $CH_2\!=\!CHR$, in which R is hydrogen or a hydrocarbyl radical with 1–12 carbon atoms, directed to obtain polymer with increased bulk density, and to certain catalyst mixtures suited for the use in said process. In particular the present invention relates to the use, in said polymerization process, of mixture of catalyst components able to form polymer fractions with different average particle size. Ziegler-Natta catalysts based on Mg, Ti and halogen are very well known in the art and are commonly used in the industrial plants for the olefin polymerization. This ample category comprises specific grades of catalysts that, in dependence of their peculiarities are used in the preparation of specific kinds of polymers. As a general rule, the desired catalysts are those that are able to give the target polymer properties while allowing the plant to keep a high productivity. One of the parameters hinting at a high productivity is the bulk density of the polymer. Generally speaking, the higher is the bulk density of the polymer the higher is the productivity of the plant. In certain cases however, it is not possible to use the catalysts capable to give high bulk density because either they are not able to impart to the polymers other desired properties or they are not suited to a given particular polymerization process. This problem for example may arise when an heterophasic copolymer is to be produced, with the same catalyst, in two sequential polymerization step. An heterophasic polymer is a polymer comprised of a crystalline polyolefin phase (matrix) within which an amorphous phase (generally a propylene/ethylene and/or alpha-olefin copolymer) is dispersed. In this case, instead of a catalyst giving high bulk density, the suitable catalyst should have a certain porosity in order to generate a porous crystalline matrix within which the amorphous phase can grow without giving rise to fouling phenomena. As a result, the target polymers are produced with a productivity of the plant below the maximum obtainable.

The applicant has now found that by employing specific catalyst mixtures it is possible to enhance the bulk density of the polymers and therefore the productivity of the polymerization processes while at the same time retaining the desired properties of the polymers. It is therefore an object of the present invention a process for the polymerization of olefins $CH_2\!=\!CHR$, in which R is hydrogen or a hydrocarbon radical with 1–12 carbon atoms, carried out in the presence of a catalyst component (A) comprising Mg, Ti and halogen as essential elements and of a catalyst component (B) capable to produce, under the same polymerization conditions, a polymer with an average particle size lower than that obtainable with the said catalyst component A. Preferably the average particle size of the polymer obtained with the catalyst (B) is at least 25% lower than that of the polymer obtained from (A) and more preferably at least 40% lower than that of the polymer obtained from (A). The catalyst component (B) can be chosen among the catalyst components known in the art provided that it is capable to give the polymer with the suitable diameter. Preferably, also the catalyst component (B) comprises Mg, Ti and halogen as essential elements. In a first particular embodiment of the present invention the catalyst component (B) has substantially the same features as the catalyst component (A) except for a lower activity under the same polymerization conditions. The said activity in particular is preferably at least 20% lower than that of (A) and more preferably at least 30% lower.

The applicant in fact, has found that the lower activity catalyst during the same polymerization time and conditions leads to a polymer with a smaller particle size. Consequently, the overall bulk density of the polymer (as obtained from the catalyst components A+B) results increased with respect of that obtainable by the use of (A) only. In a second particular embodiment of the present invention, the polymerization process is carried out with a catalyst mixture of catalyst components (A) and (B) both of them comprising Mg, Ti and halogen as essential elements and characterized by the fact that (B) is present in an amount ranging from 1 to 60% b.w. of the total (A+B) preferably from 10 to 55% b.w. and has a lower average diameter with respect to the catalyst A. Preferably, the difference between the average diameter of the two catalysts component is such that the average diameter of the catalyst component fraction B is equal to, or lower than, 75% of the value of the average diameter of the catalyst component fraction A. Preferably the average diameter of B is lower than −50% of the average diameter of A: In a preferred aspect of this embodiment the average particle diameter of the catalyst component B is from 5 to 60 μm and preferably from 5 to 40 μm while the range for the catalyst component A is from 30 to 200 μm and preferably from 30 to 120 μm and more preferably from 30 to 90 μm. When the invention is operated under this embodiment it is preferable that the two catalyst components have the substantial same activity. The present invention is particularly effective when the catalyst components A and B have a narrow particle size distribution (PSD). The breath of the PDS can be calculated according to the formula $$\frac{P90-P10}{P50},$$

wherein P90 is the value of the diameter such that 90% of the total particles have a diameter lower than that value; P10 is the value of the diameter such that 10% of the total particles have a diameter lower than that value and P50 is the value of the diameter such that 50% of the total particles have a diameter lower than that value. For the purpose of the present invention, it would be preferable that both the catalyst components A and B have a PSD calculated with the above formula lower than 1.8 and preferably lower than 1.2. In the case that the polymerization process is directed, at least in part, to the preparation of a porous polymer, it is preferred using, in the second particular embodiment, a catalyst component (B) having a porosity, determined with the mercury method, lower than that of the catalyst component (A) and in particular within the range specified below. In a preferred embodiment of the present invention the catalysts A and B comprise titanium compounds having at least a Ti-halogen bond and a Mg dihalide. The magnesium halide is preferably $MgCl_2$ in active form which is widely known from the patent literature as a support for Ziegler-Natta catalysts. Patents U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the ASTM-card reference of the spectrum of the non-active halide is diminished in intensity and broadened. In the X-ray spectra of preferred magnesium dihalides in active form said most intense line is diminished in intensity and replaced by a halo whose maximum intensity is displaced towards lower angles relative to that of the most intense line. The preferred titanium compounds used in the catalyst component of the present invention are the halides of Ti, in particular among those in which the Ti has valence 4, $TiCl_4$, and among those in which the Ti has valence lower than 4 $TiCl_3$; furthermore, can also be used Ti-haloalcoholates of formula $Ti(OR^I)_{n-y}X_y$, where n is the valence of titanium, y is a number between 1 and n, X is halogen, preferably chlorine, and $R^I$ is a C1–C15 hydrocarbon group optionally containing an heteroatom. In addition to the titanium compound and the Mg dihalide, the catalysts components can also contain, and this is especially preferred in the case of the preparation of stereoregular polymers, one or more (internal) electron donor compounds. The electron donor compound (d) can be selected from ethers, esters of organic mono or bicarboxylic acids, such as phthalates, benzoates, glutarates, succinates, ketones and amines. Preferably, it is selected from 1,3 diethers of the type disclosed in EP 361494 and EP728769, and esters of organic mono or bicarboxylic acids in particular aliphatic or aromatic phtahlates. Among this last class, particularly preferred compounds are the alkyl esters of the phthalic acids.

The preparation of the solid catalyst components can be carried out according to several methods known in the art. According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.).

The average size of the droplets of the molten adduct can be chosen for example by controlling the stirring conditions. Generally, the more vigorous and intense is the stirring the lower is the average diameter of the droplets. When the emulsion is quickly quenched, the droplets of the adduct solidify in form of spherical particles having a size substantially corresponding to that of the droplets. The control of the stirring and quenching conditions also ensures that solid spherical adducts with having a narrow particle size distribution according to the present invention are obtained. Examples of spherical adducts prepared according to this procedure are described in U.S. Pat. Nos. 4,399,054 and 4,469,648. The so obtained obtained adduct can be directly reacted with the Ti compound or it can be previously subjected to thermal controlled dealcoholation (80–130° C.) so as to obtain an adduct in which the number of moles of alcohol is generally lower than 3 preferably between 0.1 and 2.5. The reaction with the Ti compound can be carried out by suspending the adduct (dealcoholated or as such) in cold $TiCl_4$ (generally 0° C.); the mixture is heated up to 80–130° C. and kept at this temperature for 0.5–2 hours. The treatment with $TiCl_4$ can be carried out one or more times. The internal electron donor can be added during the treatment with $TiCl_4$. The treatment with the electron donor compound can be repeated one or more times. The preparation of catalyst components in spherical form is described for example in European Patent Applications EP-A-395083, EP-A-553805, EP-A-553806, EPA-601525 and WO98/44009. The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10,000 Å generally ranges from 0.3 to 1.5 $cm^3/g$, preferably from 0.45 to 1 $cm^3/g$.

The catalyst components with a very high surface area (over 300 $m^2/g$) can be obtained by directly treating the spherical solid particles of the adduct with a dealcoholating agent such as $TiCl_4$. It is a preferred aspect of the present invention under the second particular embodiment that the solid catalyst component (B) having a lower average diameter with respect to the catalyst component (A) is also characterized by a higher surface area with respect to the catalyst component (A) and in particular by a surface area higher than 250 $m^2/g$. The catalyst components having a high porosity determined with the Hg method can be obtained by reacting a titanium compound with a $MgCl_2$ adduct disclosed above which has been subject to a thermal controlled dealcoholation treatment under hot gaseous stream. Higher porosity is generally obtained by removal of high amounts of alcohol from the starting adduct. As previously mentioned, particularly when a porous polymer is to be produced, it has been found suitable to have the catalyst component (A) with a porosity (Hg method due to pores with a diameter up to 10,000 Å) higher than 0.6 $cm^3/g$ and preferably higher than 1 $cm^3/g$ and, correspondingly, a catalyst component (B) with a porosity lower than (A) and in particular in the range 0.1–0.7 $cm^3/g$. In any of the preparation methods described above the desired electron donor compound can be added as such or, in an alternative way, it can be obtained in situ by using an appropriate precursor capable to be transformed in the desired electron donor compound by means, for example, of known chemical reactions such as esterification, transesterification etc. The solid catalyst components (A) and (B) are converted into catalysts for the polymerization of olefins by reacting them with suitable co-catalysts like the organometallic compounds of the metals belonging to groups 1–2 and 13 of the Table of Elements (new notation) optionally in the presence of an external electron donor. Among organometallic compounds, organoaluminum compounds are preferred.

Particularly preferred are the alkyl-Al compound selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$. The external electron donor can be of the same type or it can be different from the internal electron donor compound present in the solid catalyst component. Suitable external electron-donor compounds include silicon compounds, ethers, esters such as ethyl 4-ethoxybenzoate, amines, heterocyclic compounds and particularly 2,2,6,6-tetramethyl piperidine, and ketones. One particular class of preferred external donor compounds is that of silicon compounds of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1–18 carbon atoms optionally containing heteroatoms. Particularly preferred are the silicon compounds in which a is 1, b is 1, c is 2, at least one of $R^5$ and $R^6$ is selected from branched alkyl, cycloalkyl or aryl groups with 3–10 carbon atoms optionally containing heteroatoms and $R^7$ is a $C_1$–$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane, 1,1,1,trifluoropropyl-metil-dimethoxysilane and 1,1,1,trifluoropropyl-2-ethylpiperidinyl-dimethoxysilane. Moreover, are also preferred the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane. The electron donor compound (c) is used in such an amount to give a molar ratio between the organoaluminum compound and said electron donor compound (c) of from 0.1 to 500, preferably from 1 to 300 and more preferably from 3 to 100. As previously indicated, the said catalyst are suitable for preparing a broad range of polyolefin products. They are particularly suitable for preparing linear low density polyethylenes (LLDPE, having a density lower than 0.940 g/cm$^3$) and very-low-density and ultra-low-density polyethylenes (VLDPE and ULDPE, having a density lower than 0.920 g/cm$^3$, to 0.880 g/cm$^3$) consisting of copolymers of ethylene with one or more alpha-olefins having from 3 to 12 carbon atoms, having a mole content of units derived from ethylene of higher than 80%. However, they can also be used to prepare, for example, high density ethylene polymers (HDPE, having a density higher than 0.940 g/cm$^3$), comprising ethylene homopolymers and copolymers of ethylene with alpha-olefins having 3–12 carbon atoms; elastomeric copolymers of ethylene and propylene and elastomeric terpolymers of ethylene and propylene with smaller proportions of a diene having a content by weight of units derived from ethylene of between about 30 and 70%; isotactic polypropylenes and crystalline copolymers of propylene and ethylene and/or other alpha-olefins having a content of units derived from propylene of higher than 85% by weight; impact resistant polymers of propylene obtained by sequential polymerization of propylene and mixtures of propylene with ethylene, containing up to 30% by weight of ethylene; copolymers of propylene and 1-butene having a number of units derived from 1-butene of between 10 and 40% by weight. In view of the above, it constitutes a further object of the present invention a process for the (co)polymerization of olefins $CH_2$=CHR, in which R is hydrogen or a hydrocarbyl radical with 1–12 carbon atoms, carried out in the presence of the catalyst described above. The olefins can be selected in particular from ethylene, propylene, butene-1,4-methyl-1-pentene, hexene-1, octene-1. The polymerization of propylene alone or in mixture with butene, hexene-1 or octene-1 is especially preferred. The polymerization process in the presence of catalysts obtained from the catalytic components of the invention can be carried out according to known techniques either in liquid or gas phase using for example the known technique of the fluidized bed or under conditions wherein the polymer is mechanically stirred.

Particularly preferred is the polymerization of propylene carried out in liquid phase using, liquid propylene as polymerization medium. The catalyst of the present invention can be used as such in the polymerization process by introducing it directly into the reactor. However, it constitutes a preferential embodiment the prepolymerization of the catalyst with an olefin. In particular, it is especially preferred pre-polymerizing ethylene, or propylene or mixtures thereof with one or more α-olefins, said mixtures containing up to 20% by mole of α-olefin, forming amounts of polymer from about 0.1 g per gram of solid component up to about 1000 g per gram of solid catalyst component. The pre-polymerization step can be carried out at temperatures from 0 to 80° C. preferably from 5 to 50° C. in liquid or gas-phase. The pre-polymerization step can be performed in-line as a part of a continues polymerization process or separately in a batch process. The batch pre-polymerization of the catalyst of the invention with ethylene in order to produce an amount of polymer ranging from 0.5 to 20 g per gram of catalyst component is particularly preferred. Examples of gas-phase processes wherein it is possible to use the spherical components of the invention are described in WO92/21706, U.S. Pat. No. 5,733,987 and WO93/03078. In this processes a pre-contacting step of the catalyst components, a pre-polymerization step and a gas phase polymerization step in one or more reactors in a series of fluidized or mechanically stirred bed are comprised. Therefore, in the case that the polymerization takes place in gas-phase, the process of the invention is suitably carried out according to the following steps:

(a) contact of the catalyst components in the absence of polymerizable olefin or optionally in the presence of said olefin in amounts not greater than 20 g per gram of the solid component (A);

(b) pre-polymerization of ethylene or mixtures thereof with one or more α-olefins, said mixtures containing up to 20% by mole of α-olefin, forming amounts of polymer from about 0.1 g per gram of solid component (A) up to about 1000 g per gram;

(c) gas-phase polymerization of one or more olefins $CH_2$=CHR, in which R is hydrogen or a hydrocarbon radical having 1–0 carbon atoms, in one or more fluidized or mechanically stirred bed reactors using the pre-polymer-catalyst system coming from (b).

As mentioned above, the pre-polymerization step can be carried out separately in batch. In this case, the pre-polymerized catalyst is pre-contacted according to step (a) with the aluminum alkyl and then directly sent to the gas-phase polymerization step (c). The molecular weight of the polymer is normally controlled using hydrogen or other agents capable to regulate the Molecular Weight. If needed the polymerization process of the invention can be performed in two or more reactors working under different conditions and optionally by recycling, at least partially, the polymer which is formed in the second reactor to the first reactor. As an example the two or more reactors can work with different concentrations of molecular weight regulator or at different polymerization temperatures or both. The following examples are given in order to further describe the present invention in a non-limiting manner.

Characterization

The properties are determined according to the following methods:

Melt Index: measured at 190° C. according to ASTM D-1238 condition "E" (load of 2.16 Kg) and "F" (load of 21.6 Kg);

Porosity and surface area with nitrogen: are determined according to the B.E.T. method (apparatus used SORPTOMATIC 1900 by Carlo Erba).

Porosity and Surface Area with Mercury for Catalyst Components:

The measure is carried out using a "Porosimeter 2000 series" by Carlo Erba

The porosity is determined by absorption of mercury under pressure. For this determination use is made of a calibrated dilatometer (diameter 3 mm) $CD_3$ (Carlo Erba) connected to a reservoir of mercury and to a high-vacuum pump ($1·10^{-2}$ mbar). A weighed amount of sample is placed in the dilatometer. The apparatus is then placed under high vacuum (<0.1 mm Hg) and is maintained in these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm². Under the effect of the pressure, the mercury enters the pores and the level goes down according to the porosity of the material.

The porosity ($cm^3/g$), both total and that due to pores up to 10,000 Å, the pore distribution curve, and the average pore size are directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.

Porosity and Surface Area with Mercury for Polymers:

The same method and apparatus disclosed for the catalyst has been used with the difference that the mercury pressure is gradually increased with nitrogen up to 2.5 Kg/cm².

Average Particle Size of the Catalyst

Determined by a method based on the principle of the optical diffraction of monochromatic laser light with the "Malvern Instr. 2600" apparatus. The average size is given as P50.

Average Particle Size of the Polymers

Determined through the use Tyler Testing Sieve Shaker RX-29 Model B available from Combustion Engineering Endecott provided with a set of six sieves, according to ASTM E11-87, of number 5, 7, 10, 18, 35, and 200 respectively.

EXAMPLES

Preparation of the Solid Catalyst Component A

Preparation of the Spherical Support ($MgCl_2$/EtOH Adduct)

The adduct of magnesium chloride and alcohol was prepared according to the method described in Example 2 of U.S. Pat. No. 4,399,054, but operating at 900 rpm instead of 10,000 rpm. The adduct contains approximately 3 mol of alcohol. The alcohol was removed from the product thus obtained at temperatures that gradually increased from 50° C. to 100° C. in nitrogen current until the alcohol content was reduced to 2.1 moles per mole of MgCl2. The dealcoholated support had an average size of approximately 50 µM.

Preparation of the Solid Catalyst Component

Into a 2 L four-necked glass reactor, equipped with a mechanical stirrer and a thermometer, purged with nitrogen, 1500 mL of $TiCl_4$ were introduced and cooled at 0° C. While stirring, 90 g of microspheroidal $MgCl_2*2.1C_2H_5OH$ and diisobuthylphtalate was added, so that Mg/DIBP molar ratio was 10.5. The temperature was raised to 100° C. and maintained for 60 min. Then, the stirring was discontinued, the solid product was allowed to settle at 100° C. for 15 minutes and the supernatant liquid was siphoned off. Then 1500 mL of fresh $TiCl_4$ were added on the solid product. The mixture was reacted at 120° C. for 30 min and than the stirring was stopped and the reactor cooled to 100° C.; the solid product was allowed to settle at 100° C. for 15 min and the supernatant liquid was siphoned off. The solid was washed with 6×600 mL of anhydrous hexane three times at 60° C. and three times at room temperature. Finally, the solid was dried under vacuum, analyzed and tested.

Preparation of the Solid Catalyst Component B

Preparation of the Spherical Support ($MgCl_2$/EtOH Adduct)

The adduct of magnesium chloride and alcohol was prepared according to the method described in Example 2 of U.S. Pat. No. 4,399,054, but operating at 2500 rpm instead of 10,000 rpm. The adduct containing approximately 3 mol of alcohol had an average size of approximately 21 µm.

Preparation of the Solid Catalyst Component

Into a 2 L four-necked glass reactor, equipped with a mechanical stirrer and a thermometer, purged with nitrogen, 1500 mL of $TiCl_4$ were introduced and cooled at 0° C. While stirring, 75 g of microspheroidal $MgCl_2*2.8C_2H_5OH$ and diisobuthylphtalate was added, so that Mg/DIBP molar ratio was 13. The temperature was raised to 100° C. and maintained for 60 min. Then, the stirring was discontinued, the solid product was allowed to settle at 100° C. for 15 minutes and the supernatant liquid was siphoned off. Then 1500 mL of fresh $TiCl_4$ were added on the solid product. The mixture was reacted at 120° C. for 30 min and than the stirring was stopped and the reactor cooled to 100° C.; the solid product was allowed to settle at 100° C. for 15 min and the supernatant liquid was siphoned off. The solid was washed with 6×600 mL of anhydrous hexane three times at 60° C. and three times at room temperature. Finally, the solid was dried under vacuum, analyzed and tested.

Example 1

Preparation of the Solid Catalyst Component Mixture A/B and Polymerization Test

In a 4-liter autoclave, purged with nitrogen flow at 70° C. for one hour, 75 ml of anhydrous hexane containing 800 mg of $AlEt_3$, 56.4 mg of cyclohexylmethyldimethoxysilane, 7.9 mg of component A and 2.1 mg of component B were introduced in propylene flow at 30° C. The autoclave was closed. 1.5 Nl of hydrogen were added and then, under stirring, 1.2 Kg of liquid propylene were fed. The temperature was raised to 70° C. in five minutes and the polymerization was carried out at this temperature for two hours. The non-reacted propylene was removed, the polymer was recovered and dried at 70° C. under vacuum for three hours and, then, weighed. The BDP and the APS of the polymer were measured and reported in Table 1.

Examples 2–4

The polymerization of Example 1 was repeated using the quantities of catalyst A and B reported in Table 1.

Comparison Example 1

The same procedure disclosed in Example 1 was repeated with the difference that 10 mg of component A were used.

Comparison Example 2

The same procedure disclosed in Example 1 was repeated with the difference that 10 mg of component B were used.

TABLE 1

| Example | Amount of Catalyst A/B (mg/mg) | B.D. (g/cc) | A.P.S. (polymer) (μm) | Porosity (polymer) (cc/g) |
|---|---|---|---|---|
| 1 | 7.9/2.1 | 0.466 | 1800 | n.a |
| 2 | 7.7/2.3 | 0.465 | n.a | n.a |
| 3 | 5.9/4.1 | 0.481 | 1550 | 0.055 |
| 4 | 4.9/5.1 | 0.475 | n.a | n.a |
| Comp. 1 | 10/0 | 0.453 | 2100 | 0.09 |
| Comp. 2 | 0/10 | 0.483 | 950 | 0.006 |

B.D = Bulk Density
A.P.S. = Average Particle Size

The invention claimed is:

1. A process for the polymerization of olefins $CH_2=CHR$, in which R is hydrogen or a hydrocarbon radical with 1–12 carbon atoms, comprising: polymerizing the olefins in the presence of a catalyst component (A) comprising Mg, Ti and halogen, and a catalyst component (B); wherein a polymer prepared by the catalyst component (B) has an average particle size lower than a polymer prepared by the catalyst component (A), under the same polymerization conditions.

2. The process according to claim 1 in which the catalyst components (A) and (B) are reacted with organometallic compounds of metals belonging to groups 1, 2 and 13 of the Table of Elements.

3. The process according to claim 1 in which the average particle size of the polymer obtained with the catalyst component (B) is at least 25% lower than that of the polymer obtained from the catalyst component (A).

4. The process according to claim 3 in which the average particle size of the polymer obtained with the catalyst component (B) is at least 40% lower than that of the polymer obtained from the catalyst component (A).

5. The process according to claim 1 in which also the catalyst component (B) comprises Mg, Ti and halogen.

6. The process according to claim 1 in which the catalyst component (B) has a lower activity than the catalyst component (A).

7. The process according to claim 6 in which the catalyst component (B) has an activity at least 20% lower than that of the catalyst component (A).

8. The process according to claim 7 in which the catalyst component (B) has an activity at least 30% lower than that of the catalyst component (A).

9. The process according to claim 1 in which both of catalyst component (A) and catalyst component (B) comprise Mg, Ti and halogen; wherein the catalyst component (B) is present in an amount ranging from 1 to 60% b.w. of the total (A+B) and has a lower average diameter than that of the catalyst component A.

10. The process according to claim 9 in which the average diameter of the catalyst component (B) is no greater than 75% of the average diameter of the catalyst component (A).

11. The process according to claim 9 in which the average diameter of the catalyst component (B) is no greater than 50% of the average diameter of the catalyst component (A).

12. The process according to claim 1 in which the catalyst components (A) and (B) have a PSD lower than 1.8; wherein the PSD is calculated according to the formula $$\frac{P90-P10}{P50},$$

wherein P90 is the value of a diameter such that 90% of the total particles have a diameter lower than that value; P10 is the value of the diameter such that 10% of the total particles have a diameter lower than that value and P50 is the value of the diameter such that 50% of the total particles have a diameter lower than that value.

13. The process according to claim 1 in which the catalyst component (B) has a porosity, determined with the mercury method, lower than a porosity of the catalyst component (A).

14. The process according to claim 1 in which the olefin $CH_2=CHR$ is selected from the group consisting of ethylene, propylene, butene-1, hexene-1, octene-1 and their mixtures.

15. A catalyst component for the polymerization of olefins $CH_2=CHR$, in which R is hydrogen or a hydrocarbon radical with 1–12 carbon atoms, comprising at least two catalyst component fractions A and B, both of them comprising Mg, Ti and halogen; wherein the catalyst component fraction B is present in an amount ranging from 1 to 60% b.w. of the total (A+B) and has an average particle diameter lower than an average particle diameter of the catalyst component fraction A.

16. The process according to claim 1 for the polymerization of propylene optionally in a mixture with butene, hexene-1 or octene-1, said process being carried out in liquid phase using liquid propylene as polymerization medium.

17. The catalyst component according to claim 15 wherein a difference between the average diameter of the catalysts component fractions is such that the average diameter of the catalyst component fraction B is no greater than 75% of the average diameter of the catalyst component fraction A.

18. The catalyst component according to claim 15 in which the catalyst components A and B have a PSD lower than 1.8; wherein the PSD is calculated according to the formula $$\frac{P90-P10}{P50},$$

wherein P90 is the value of the diameter such that 90% of the total particles have a diameter lower than that value; P10 is the value of the diameter such that 10% of the total particles have a diameter lower than that value and P50 is the value of the diameter such that 50% of the total particles have a diameter lower than that value.

19. The catalyst component according to claim 15 in which the average particle diameter of the catalyst component B is from 5 to 60 μm while the average particle diameter of the catalyst component A is from 30 to 200 μm.

20. The catalyst component according to claim 15 in which both fractions (A) and (B) comprise a Ti halide or haloalcoholate of formula $Ti(OR^I)_{n-y}X_y$, where n is the valence of titanium, y is a number between 1 and n, X is halogen, and $R^I$ is a C1–C15 hydrocarbon group optionally containing an heteroatom, supported on a $MgCl_2$.

21. The catalyst component according to claim 20 further comprising an internal electron donor selected from the group consisting of ethers, esters of organic mono or bicarboxylic acids, ketones, amines and their mixtures.

22. The catalyst component according to claim 21 in which the internal electron donor is an ester of organic mono or bicarboxylic acid selected from phthalates, benzoates, glutarates, and succinates.

23. The catalyst component according to claim 21 in which the internal electron donor is a 1,3 diether.

24. The catalyst component according to claim 15 wherein both the catalyst fractions A and B are prepared by reacting a titanium compound of formula $Ti(OR)_{n-y}X_y$, where n is the valence of titanium and y is a number between 1 and n, with an adduct of formula $MgCl_2 \cdot pROH$, where p is a number between 0.1 and 6, and R is a hydrocarbon radical having 1–18 carbon atoms.

25. The catalyst component according to claim 15 wherein the solid catalyst component fraction B has a porosity (Hg method due to pores with a diameter up to 10,000 Å) lower than a porosity of the catalyst component fraction A.

26. The catalyst component according to claim 25 in which the catalyst component fraction A has a porosity higher than 0.6 $cm^3/g$ and the catalyst component fraction B has a porosity in the range 0.1–0.7 $cm^3/g$.

27. A catalyst for the polymerization of olefins obtained by reacting the catalyst component according to claim 15 with organometallic compounds of metals belonging to groups 1, 2 and 13 of the Table of Elements (new notation) optionally, in the presence of an electron donor compound.

28. The catalyst component according to claim 24 wherein the titanium compound is $TiCl_4$.

29. The catalyst component according to claim 24 wherein p is from 2 to 3.5.

* * * * *